(12) United States Patent
Umesh et al.

(10) Patent No.: US 8,750,247 B2
(45) Date of Patent: Jun. 10, 2014

(54) MOBILE COMMUNICATION SYSTEM, MOBILE DEVICE, AND CONTROL DEVICE

(75) Inventors: Anil Umesh, Yokohama (JP); Masafumi Usuda, Tokyo (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 715 days.

(21) Appl. No.: 11/659,802

(22) PCT Filed: Aug. 11, 2005

(86) PCT No.: PCT/JP2005/014756
§ 371 (c)(1),
(2), (4) Date: Jul. 3, 2007

(87) PCT Pub. No.: WO2006/016652
PCT Pub. Date: Feb. 16, 2006

(65) Prior Publication Data
US 2008/0014942 A1    Jan. 17, 2008

(30) Foreign Application Priority Data
Aug. 11, 2004 (JP) ................. P2004-234884

(51) Int. Cl.
*H04W 4/00* (2009.01)
(52) U.S. Cl.
USPC ........... 370/332; 370/331; 455/436; 455/437; 455/443
(58) Field of Classification Search
USPC ......... 370/331, 332, 329, 335, 336, 341, 342, 370/320; 455/436–444
See application file for complete search history.

(56) References Cited

U.S. PATENT DOCUMENTS

| | | | |
|---|---|---|---|
| 7,013,143 B2 * | 3/2006 | Love et al. | 455/450 |
| 7,079,859 B2 * | 7/2006 | Nobukiyo et al. | 455/522 |
| 7,133,688 B2 * | 11/2006 | Das et al. | 455/522 |
| 7,224,977 B2 * | 5/2007 | Cavalli et al. | 455/452.1 |

(Continued)

FOREIGN PATENT DOCUMENTS

| CN | 1488206 A | 4/2004 |
|---|---|---|
| EP | 1 341 318 A2 | 9/2003 |

(Continued)

OTHER PUBLICATIONS

Qualcomm; "Channel Structure for Consideration in Enhanced Uplink", 3GPP, Feb. 18-21, 2003, 3GPP TSG RAN WG1 #31 Tdoc R1-03-0273, pp. 1-6, Tokyo, Japan.
Amitava Ghosh et al., "Overview of Enhanced Uplink for 3GPP W-CDMA", Vehicular Technology Conference, 2004, VTC 2004-Spring. 2004 IEEE 59th, Milan, Italy, May 17-19, 2004 Piscataway, NJ, USA, IEEE, US, vol. 4, May 17, 2004, pp. 2261-2265, XP010766561.

(Continued)

*Primary Examiner* — Magdi Elhag
(74) *Attorney, Agent, or Firm* — Marvin A. Motsenbocker; Mots Law, PLLC (57) ABSTRACT

The present invention relates to a mobile communication system which applies a high-speed downlink packet transmission scheme (HSDPA scheme) in a downlink and an enhanced uplink packet transmission scheme (EUL scheme) in a uplink between a mobile station and a base station. In the mobile communication system according to the present invention, a serving cell in the high-speed downlink packet transmission scheme for a specified mobile station and a serving cell in the enhanced uplink packet transmission scheme for the specified mobile station are modified so as to become the same cell.

8 Claims, 9 Drawing Sheets

(56) References Cited

U.S. PATENT DOCUMENTS

| | | | |
|---|---|---|---|
| 7,324,821 B2* | 1/2008 | Kwak et al. | 455/453 |
| 7,463,616 B1* | 12/2008 | Earnshaw et al. | 370/347 |
| 7,633,899 B2* | 12/2009 | Choi et al. | 370/329 |
| 7,738,423 B2* | 6/2010 | Khan | 370/331 |
| 2003/0108013 A1 | 6/2003 | Hwang et al. | |
| 2003/0123396 A1* | 7/2003 | Seo et al. | 370/252 |
| 2003/0224774 A1* | 12/2003 | Cheng et al. | 455/422.1 |
| 2004/0022217 A1 | 2/2004 | Korpela et al. | |
| 2004/0192308 A1* | 9/2004 | Lee et al. | 455/436 |

FOREIGN PATENT DOCUMENTS

| | | |
|---|---|---|
| EP | 1 351 539 A2 | 10/2003 |
| EP | 1351539 A2 | 10/2003 |
| JP | 2004-072513 | 3/2004 |
| WO | WO 99/43177 | 8/1999 |

OTHER PUBLICATIONS

Siemens, "Feasibility of IR schemes for Enhanced Uplink DCH in SHO", 3GPP TSG RAN WG1 Meeting #36, Tdoc R1-040207, Feb. 16-20, 2004

Official Action Letter issued on Jul. 31, 2008 in the counterpart Korean Patent application.

The Chinese office action issued on Sep. 26, 2011 in the counterpart Chinese patent application.

The Chinese office action issued on Apr. 12, 2013 in the counterpart Chinese patent application.

Chinese OA issued on Sep. 26, 2013 in the counterpart Chinese patent application.

* cited by examiner

FIG.1

(a) CELLULAR CONFIGURATION (b) THREE-SECTOR CELL CONFIGURATION (c) SIX-SECTOR CELL CONFIGURATION

FIG.2

(b) HSDPA CELL CHANGE (a) HSDPA

MOBILE COMMUNICATION SYSTEM, MOBILE DEVICE, AND CONTROL DEVICE

<TECHNICAL FIELD>

The present invention relates to a technology for simplifying a procedure for controlling a mobile communication system which performs radio communications in a sector cell configuration, by using a scheduler in both a downlink (DL: DownLink) and an uplink (UL: UpLink).

In particular, the present invention is a technology applicable to a W-CDMA system or a CDMA2000 system, which are third generation mobile communication systems.

<BACKGROUND ART>

Figure 1:
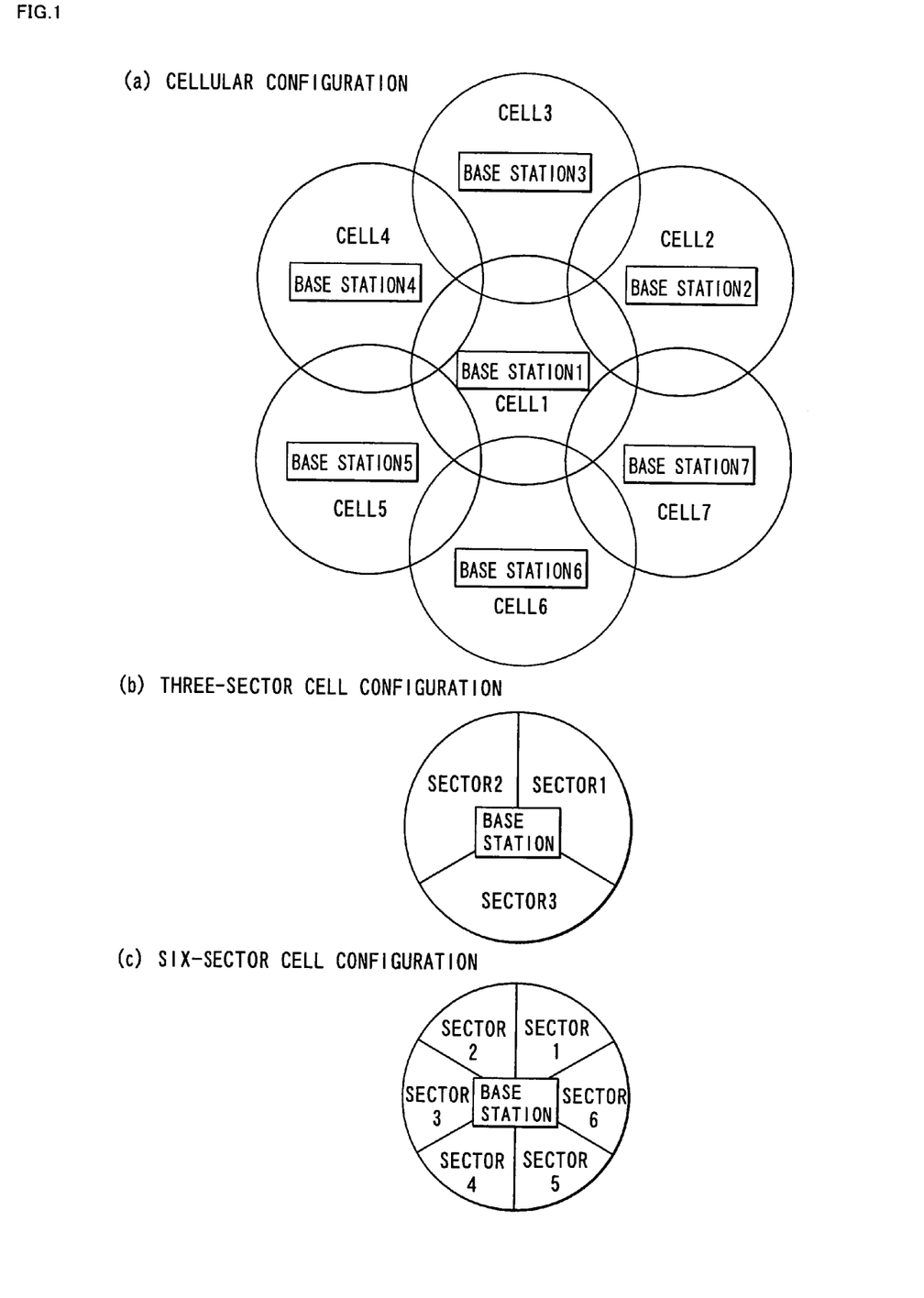
FIGS. 1(a) to 1(c) are views showing sector cell configurations.

Heretofore, in mobile communication systems, as shown in FIG. 1(a), a cellular system is employed in which a plurality of base stations are placed in a cellular manner to cover a service area entirely.

Moreover, in the conventional mobile communication systems, a sector cell configuration is used in which a service area is configured by dividing each cell into a plurality of sectors and installing a base station antenna for each sector.

Typically, in a conventional mobile communication service, a three-sector cell configuration (see FIG. 1(b)) or a six-sector cell configuration (see Fig. 1(c)) is employed.

Currently, in the "W-CDMA", which is the third generation mobile communication system that is being standardized by an international standardization organization "3GPP", specifications of HSDPA (High Speed Downlink Packet Access: high-speed downlink packet transmission) scheme have almost been completed.

In the HSDPA, as shown in FIG. 2(a), each mobile station is configured to transmit radio quality information (CQI: Channel Quality Indicator) on its own downlink to a base station on an HS-DPCCH (High Speed Dedicated Physical Control Channel), which is an uplink physical control channel.

Further, as shown in FIG. 2(a), the base station is configured to schedule a mobile station to which downlink data is to be transmitted and the data size thereof every two milliseconds in consideration of the CQI from all mobile stations in a cell/sector, and transmit downlink data on an HS-PDSCH (High Speed Physical Downlink Shared Channel), which is a downlink physical data channel for the HSDPA.

In the HSDPA, each mobile station is scheduled by only one cell/sector at a time. The cell/sector which thus provides a service to the mobile station is called an "HSDPA serving cell (servicing cell)".

A cell/sector which provides the highest level of a received signal to the mobile station serves as the HSDPA serving cell.

Figure 2:
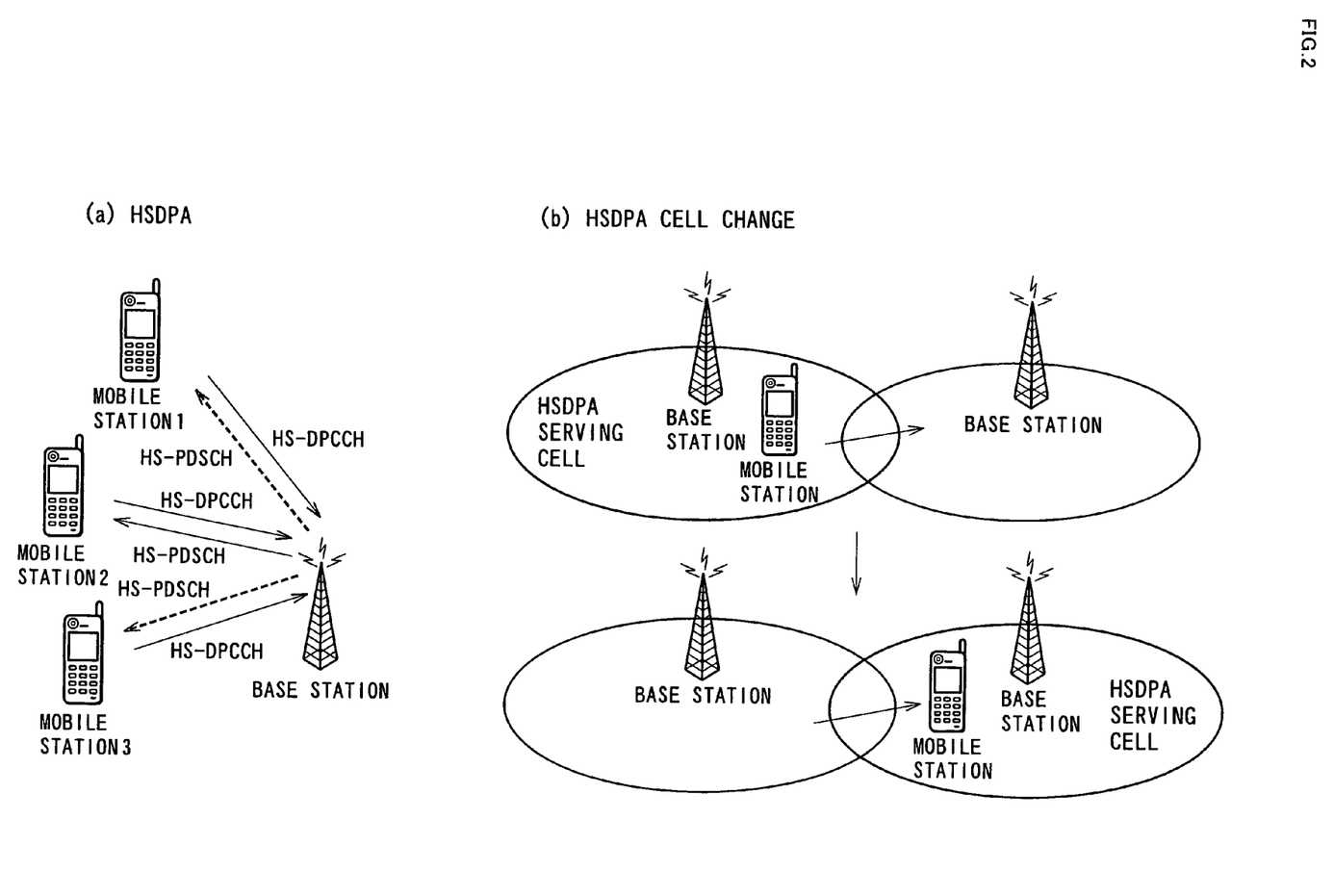
FIGS. 2(a) and 2(b) are views for explaining an HSDPA scheme.

As shown in FIG. 2 (b), when the level of a received signal from another cell/sector becomes higher as the mobile station moves, the mobile station notifies a network (a base station and a control apparatus) of this change. As a result, the HSDPA serving cell is switched. Such an operation is called an "HSDPA cell change (cell change)".

In the example of FIG. 2 (a), the base station transmits downlink data only to a mobile station 2 of which HS-PDSCH is indicated by a solid line. Mobile stations 1 and 3 of which HS-PDSCHs are indicated by dotted lines are in the state of waiting for being scheduled by the base station.

Further, in the "W-CDMA", which is the third generation mobile communication system that is being standardized by an international standardization organization "3GPP", an EUL (Enhanced UL: enhanced uplink transmission) scheme is currently being standardized.

Figure 3:
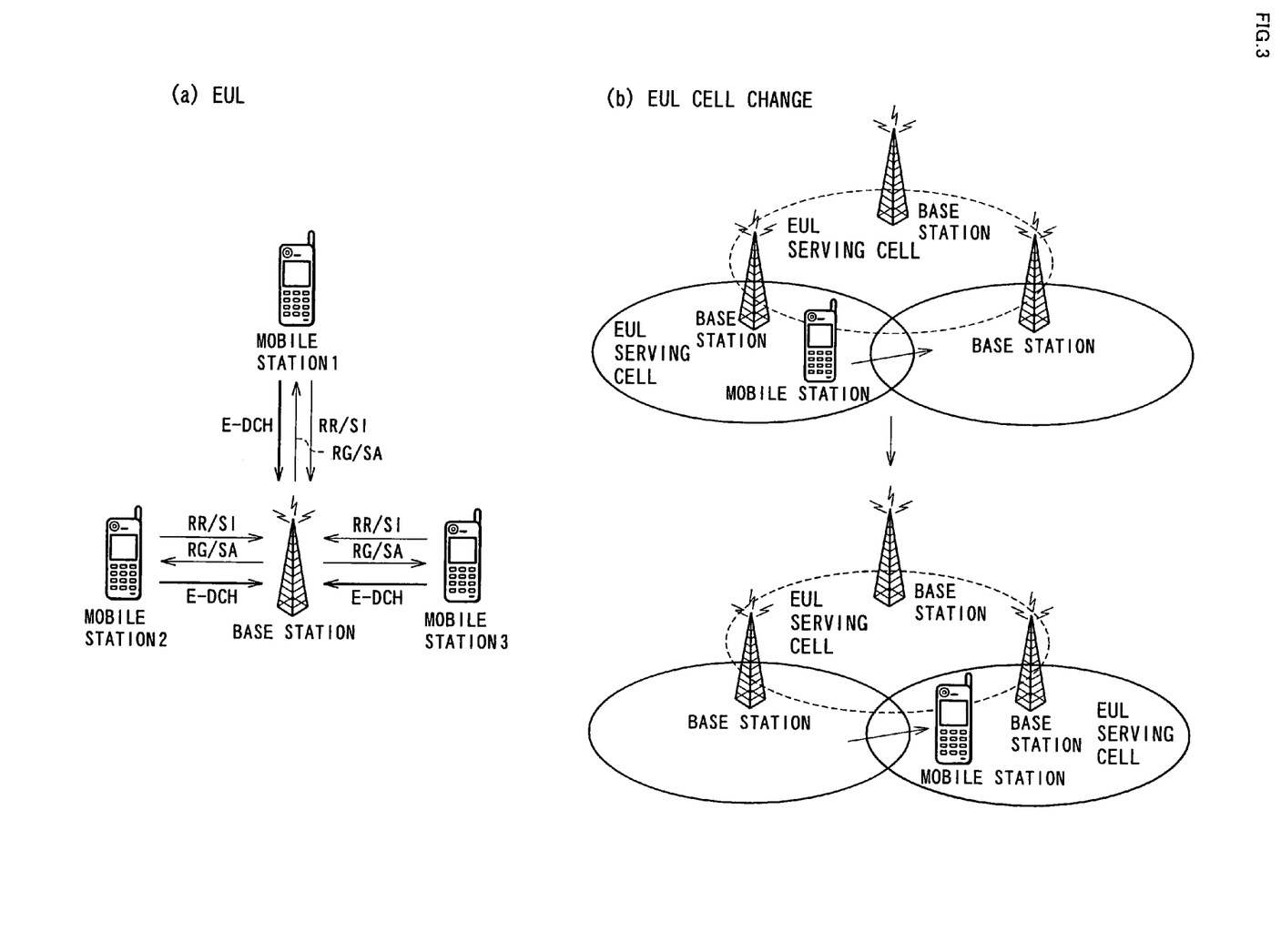
FIGS. 3(a) and 3(b) are views for explaining an EUL scheme.

In the EUL, as shown in FIG. 3 (a), each mobile station is configured to transmit, to a base station, a transmit rate (RR: Rate Request) which the mobile station requests, or information (SI: Scheduling Information) on a transmit buffer, a power status and the like.

Moreover, as shown in FIG. 3(a), the base station is configured to schedule a mobile station which the base station permits to transmit uplink data and the transmit rate thereof as Rate Grant (RG)/Scheduling Assignment (SA) every two or ten milliseconds, in consideration of the RR/SI from all mobile stations in a cell/sector.

In addition, as shown in FIG. 3 (a), each mobile station is configured to transmit uplink data on an E-DCH (Enhanced Dedicated Channel) according to the RG/SA from the base station.

In the EUL, it has not yet been decided at this moment whether each mobile station is scheduled by only one cell/sector or a plurality of cells/sectors at a time.

It should be noted that such a cell/sector or cells/sectors (i.e., cell(s)/sector(s) providing a service to the mobile station) in the EUL is or are called an "EUL serving cell (serving cell(s))".

Although it has not yet been decided at this moment which cell/sector should serve as an "EUL serving cell", there are two candidates described below.

The first one is a cell/sector in which a signal transmitted by the mobile station has the highest received level. The second one is a cell/sector which provides the highest level of a received signal to the mobile station as in the case of the HSDPA.

In either case, as in the case of the HSDPA, as the mobile station moves, a "cell change (EUL cell change)" occurs. In FIG. 3(b), a cell indicated by a dotted line represents an example for the case where a plurality of EUL serving cells are used.

In the case where the EUL scheme is applied in an uplink, and where the HSDPA scheme is applied in a downlink, a possible cell change method is to make cell changes separately in the uplink and in the downlink.

By doing so, even in the case where an inversion of uplink quality between cells/sectors occurs at a timing different from that of an inversion of downlink quality therebetween, cell changes can be made at optimum timings in both the EUL scheme and the HSDPA scheme.

However, since the timing of the inversion of uplink quality between cells/sectors is generally near the timing of the inversion of downlink quality therebetween, there is not much merit in controlling cell changes separately in the EUL scheme and the HSDPA scheme.

On the contrary, making cell changes separately in the EUL scheme and the HSDPA scheme may cause problems described below.

The first problem is that the above possible method needs control procedures twice as many as, and control signal transmissions twice as often as those for the case where only a cell change in any one of the EUL scheme and the HSDPA scheme is controlled.

To be more precise, when a cell change is made, it is necessary to monitor both a trigger for a cell change in the EUL scheme and a trigger for a cell change in the HSDPA scheme. This leads to an increase in processing loads of the mobile station and the base station/control apparatus.

Further, when the two triggers are generated, transmissions of control signals between the mobile station and the base station/control apparatus need to be performed separately for cell changes in the EUL scheme and the HSDPA scheme. This leads to an excessive use of radio capacity.

The second problem is that a physical control signal for the EUL scheme cannot be time-multiplexed on an HS-DPCCH.

To be more precise, if a cell change in the HSDPA scheme is made separately from a cell change in the EUL scheme, a cell for the HSDPA scheme may be changed to a cell/sector of a base station on which the EUL scheme is not implemented, while the mobile station is applying the EUL scheme in an uplink.

At this time, if a physical control signal in the EUL scheme is time-multiplexed on an HS-DPCCH, in order to save uplink codes and radio resources and to reduce a PAR (Peak-to-Average Ratio) of the mobile station, a base station which supports only the HSDPA scheme recognizes that the physical control signal in the EUL scheme which is transmitted on the HS-DPCCH is a physical control signal in the HSDPA scheme. Thus, quality in the HSDPA scheme is deteriorated.

<DISCLOSURE OF THE INVENTION>

The present invention has been accomplished in view of the above-described points. An object of the present invention is to provide a mobile communication system, a mobile station, and a control apparatus in which a cell change procedure in the EUL scheme and a cell change procedure in the HSDPA scheme are performed as a set, so as to prevent an increase in a control procedure load and a signal quantity at the time of a cell change, and to enable a physical control signal in the EUL scheme to be time-multiplexed on an HS-DPCCH.

A first aspect of the present invention is summarized as a mobile communication system which applies a high-speed downlink packet transmission scheme (HSDPA scheme) in a downlink and an enhanced uplink packet transmission scheme (EUL scheme) in a uplink between a mobile station and a base station, wherein, a serving cell in the high-speed downlink packet transmission scheme for a specified mobile station and a serving cell in the enhanced uplink packet transmission scheme for the specified mobile station are configured to be modified so as to become the same cell.

In the first aspect of the present invention, when a condition for modifying a serving cell in the high-speed downlink packet transmission scheme is satisfied, the serving cell in the high-speed downlink packet transmission scheme for the specified mobile station and the serving cell in the enhanced uplink packet transmission scheme for the specified mobile station can be configured to be modified so as to become the same cell.

In the first aspect of the present invention, each mobile station can be configured to determine whether or not the condition for modifying a serving cell in the high-speed downlink packet transmission scheme is satisfied, based on a received signal level in the mobile station.

A second aspect of the present invention is summarized as a mobile station which applies a high-speed downlink packet transmission scheme (HSDPA scheme) in a downlink and an enhanced uplink packet transmission scheme (EUL scheme) in a uplink with and a base station, wherein, when a condition for modifying a serving cell in the high-speed downlink packet transmission scheme is satisfied, the mobile station is configured to transmit to a control apparatus a signal for requesting to modify a serving cell in the high-speed downlink packet transmission scheme for a specified mobile station and a serving cell in the enhanced uplink packet transmission scheme for the specified mobile station so that the serving cell in the high-speed downlink packet transmission scheme for the specified mobile station and the serving cell in the enhanced uplink packet transmission scheme for the specified mobile station become the same cell.

In the second aspect of the present invention, the mobile station can be configured to determine whether or not the condition for modifying a serving cell in the high-speed downlink packet transmission scheme is satisfied, based on a received signal level in the mobile station.

A third aspect of the present invention is summarized as a control apparatus in a mobile communication system which applies a high-speed downlink packet transmission scheme (HSDPA scheme) in a downlink and an enhanced uplink packet transmission scheme (EUL scheme) in a uplink between a mobile station and a base station, wherein, the control apparatus is configured to modify a serving cell in the high-speed downlink packet transmission scheme for a specified mobile station and a serving cell in the enhanced uplink packet transmission scheme for the specified mobile station so that the serving cell in the high-speed downlink packet transmission scheme for the specified mobile station and the serving cell in the enhanced uplink packet transmission scheme for the specified mobile station become the same cell, when receiving, from the specified mobile station, a signal for requesting to modify a serving cell in the high-speed downlink packet transmission scheme and a serving cell in the enhanced uplink packet transmission scheme.

Figure 4:
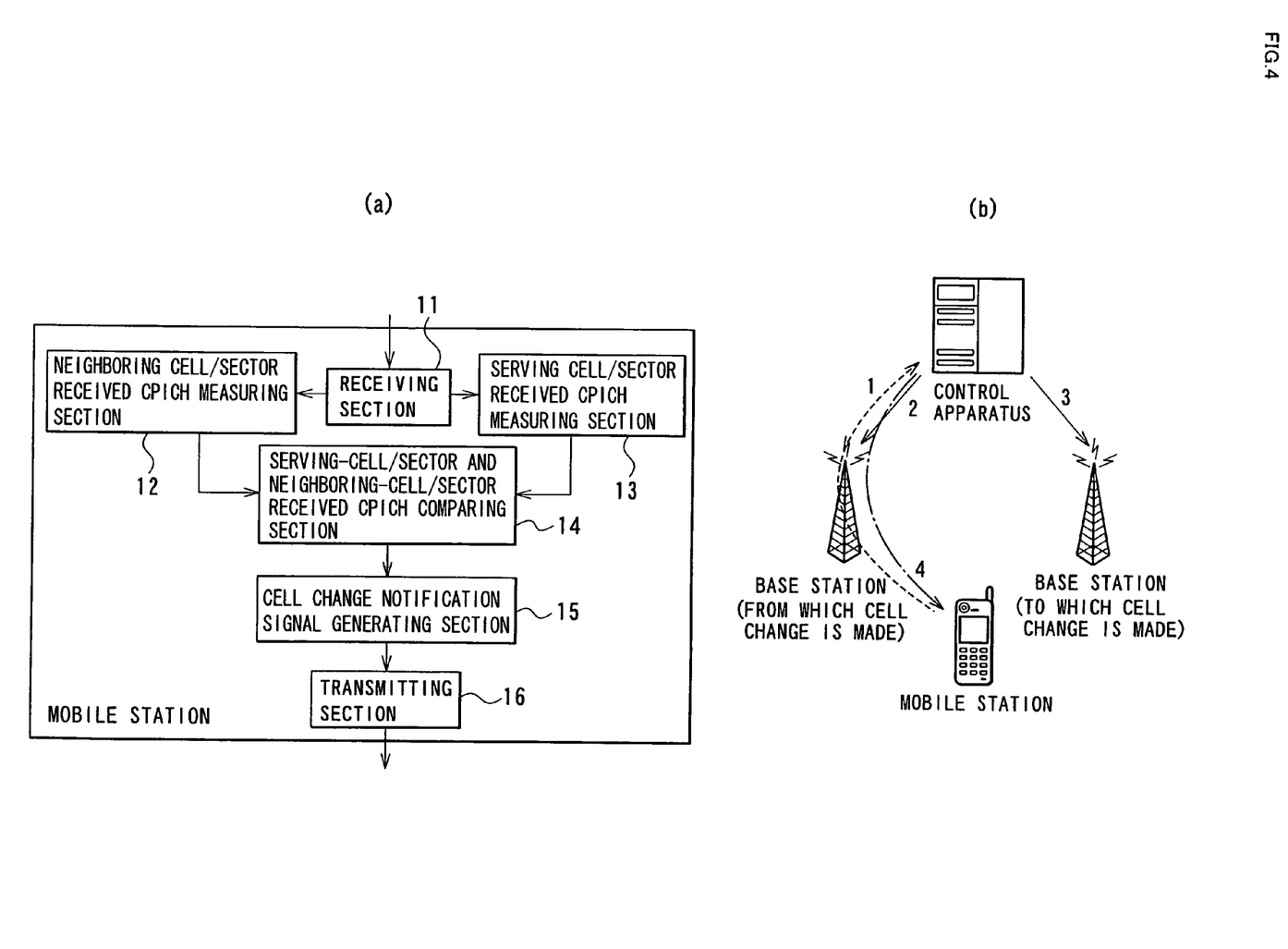
FIGS. 4(a) and 4(b) are views for explaining a cell change procedure in the HSDPA scheme.
Figure 5:
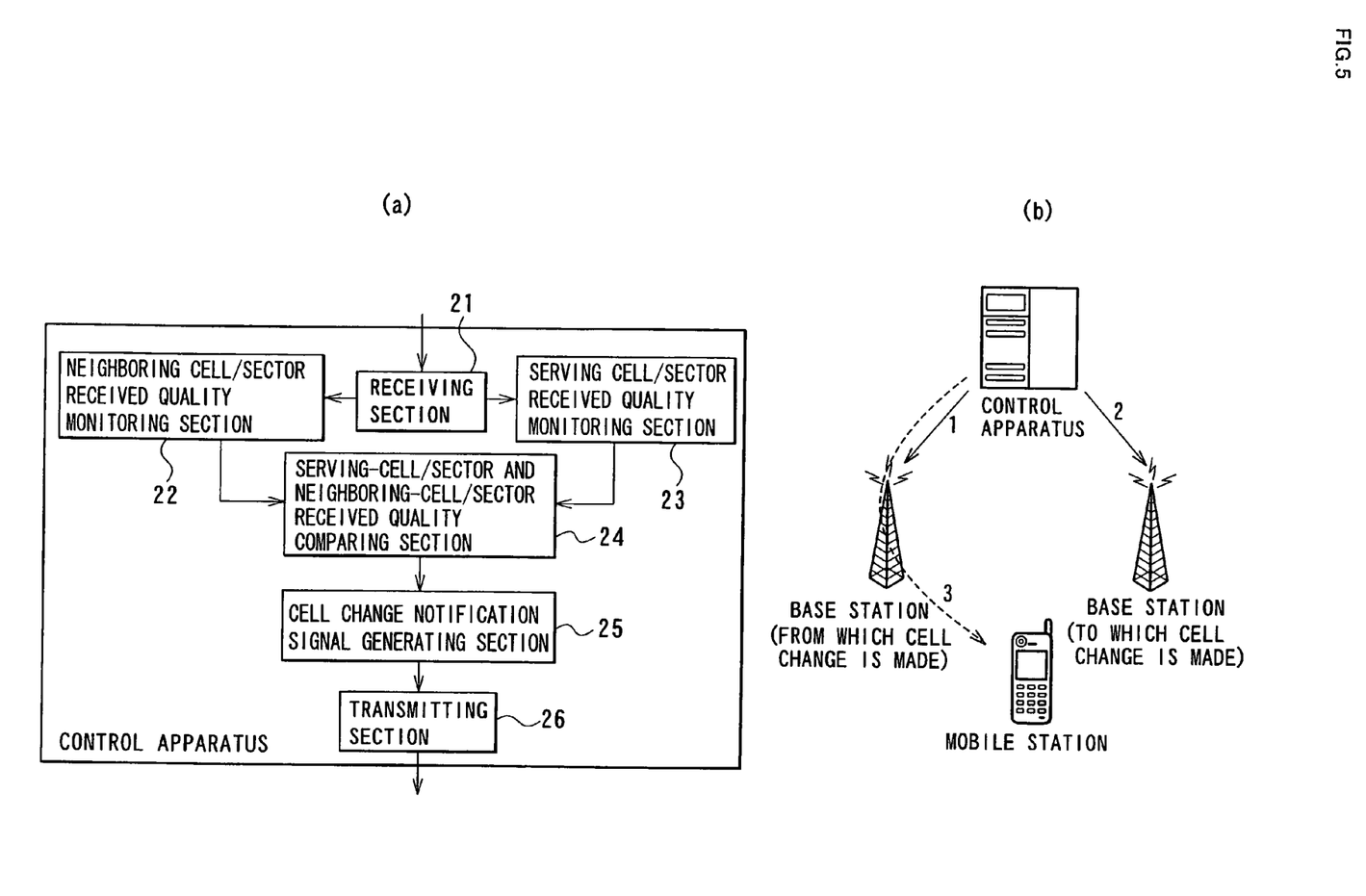
FIGS. 5(a) and 5(b) are views for explaining a cell change procedure in the EUL scheme.
Figure 6:
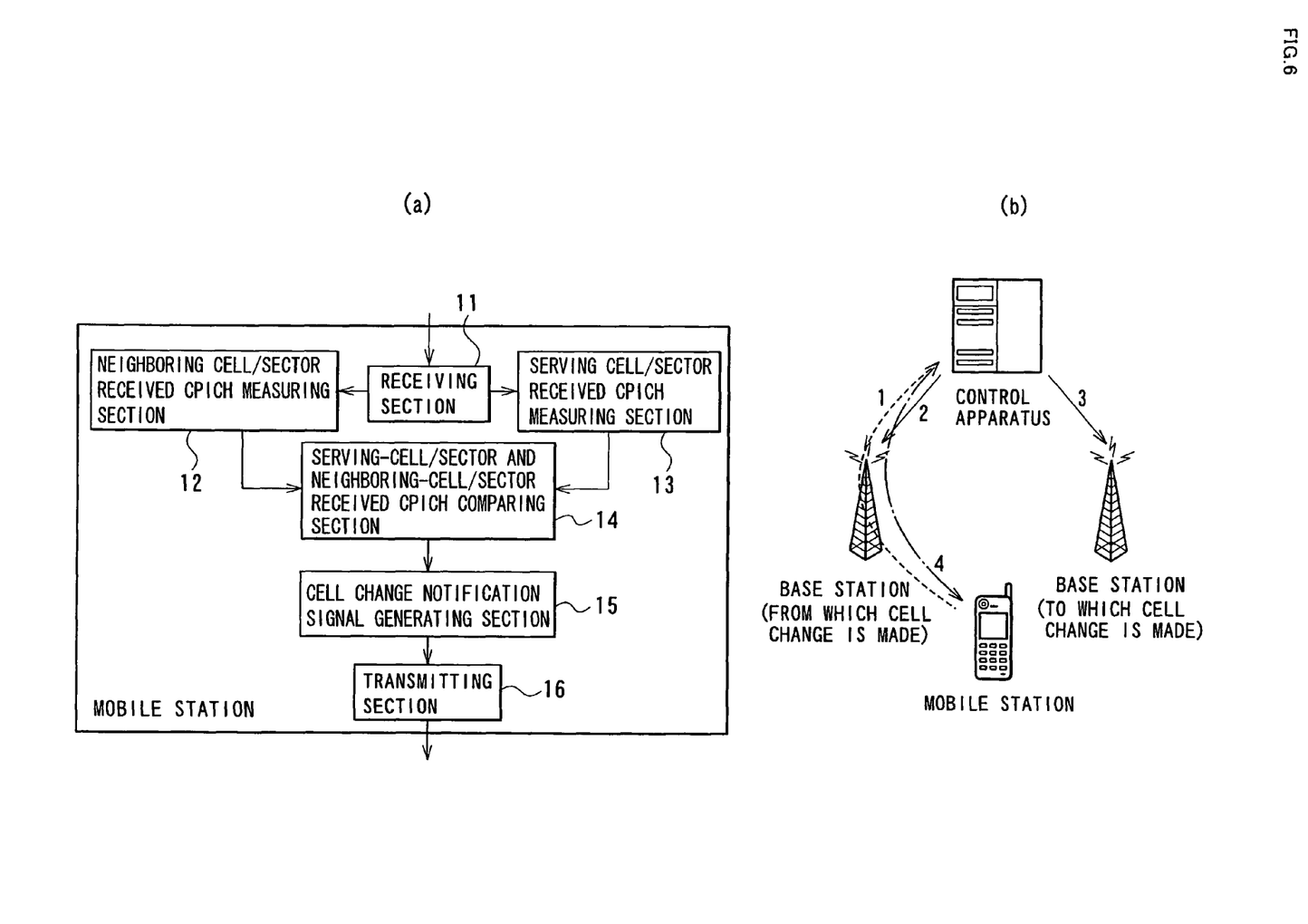
FIGS. 6(a) and 6(b) are views for explaining a cell change procedure in a mobile communication system according to a first embodiment of the present invention.

<BEST MODE FOR CARRYING OUT THE INVENTION>(First Embodiment of the Present Invention) Referring to FIGS. 4 to 6, a mobile communication system according to a first embodiment of the present invention will be described. FIGS. 4 to 6 show that a control procedure load and a control signal quantity in a cell change procedure can be reduced by performing the cell change procedure by pairing a serving cell in the HSDPA scheme and a serving cell in the EUL scheme.

FIGS. 4 show a cell change procedure in the HSDPA scheme.

As shown in FIG. 4(a), a mobile station includes a receiving section 11, a neighboring cell/sector received CPICH measuring section 12, a serving cell/sector received CPICH measuring section 13, a serving-cell/sector and neighboring-cell/sector received CPICH comparing section 14, a cell change notification signal generating section 15, and a transmitting section 16.

The receiving section 11 is configured to always receive CPICH (Common Pilot Channel) from a serving cell/sector (hereinafter referred to as a serving cell) and a neighboring cell/sector.

The neighboring cell/sector received CPICH measuring section 12 is configured to measure the received power of the CPICH from the neighboring cell/sector. The serving cell/sector received CPICH measuring section 13 is configured to measure the received power of the CPICH from the serving cell.

The serving-cell/sector and neighboring-cell/sector received CPICH comparing section 14 is configured to compare the received power of the CPICH from the neighboring cell/sector and the received power of the CPICH from the serving cell.

In the case where the level of the received power of the CPICH from the neighboring sector/cell is stably higher than that of the CPICH from the serving cell, the cell change notification signal generating section 15 generates a cell change notification signal for prompting a control apparatus to make a cell change, and the transmitting section 16 transmits the cell change notification signal to the control apparatus via a base station (step 1 in FIG. 4(b)).

As shown in FIG. 4(b), upon receiving the cell change notification signal, the control apparatus notifies cell change timing to a base station from which a cell change is made and a base station to which a cell change is made, using the cell change notification signal (steps 2 and 3 in FIG. 4(b)).

Moreover, the control apparatus also notifies the same cell change timing to the mobile station via the base station, using another signal (step 4 in FIG. 4(b)).

The mobile station and the base stations are configured to make a cell change at the same time with the cell change timing notified as described above.

FIGS. 5 show a procedure for the case where a cell change is made according to uplink quality in the EUL scheme independently from the HSDPA scheme.

In the case where a cell change is made according to uplink quality, since a base station does not know received qualities of other cells, the control apparatus needs to manage uplink qualities of a plurality of cells. Accordingly, such functions (sections 22 to 24 in FIG. 5(a)) need to be newly added to the control apparatus.

Specifically, as shown in FIG. 5(a), the control apparatus includes a receiving section 21, a neighboring cell/sector received quality monitoring section 22, a serving-cell/sector received quality monitoring section 23, a serving-cell/sector and neighboring-cell/sector received quality comparing section 24, a cell change notification signal generating section 25, and a transmitting section 26.

In the case where the serving-cell/sector and neighboring-cell/sector received quality comparing section 24 has obtained a measurement indicating that the uplink quality (received quality) of the neighboring cell/sector is stably better than the uplink quality (received quality) of the serving cell, the cell change notification signal generating section 25 is configured to generate a cell change notification signal for notifying a cell change to the base stations.

Then, as shown in FIG. 5(b), the transmitting section 26 of the control apparatus notifies cell change timing to a base station from which a cell change is made and a base station to which a cell change is made, using the cell change notification signal (steps 1 and 2 in FIG. 5(b)), and also notifies the same cell change timing to the mobile station via the base station using another signal. As a result, a control signal quantity is increased.

If cell changes are made separately in the HSDPA scheme and the EUL scheme, all the procedures shown in FIGS. 4 to 5 need to be performed. This leads to increases in a control procedure load and a signal quantity.

In order to reduce these, the mobile communication system according to this embodiment is configured to perform a cell change procedure in the EUL scheme simultaneously with a cell change procedure in the HSDPA scheme.

FIGS. 6 show a cell change procedure according to this embodiment.

As shown in FIG. 6(a), a cell change trigger in the EUL scheme is the same as a cell change trigger in the HSDPA scheme. Accordingly, cell change monitoring is enough to be performed only by the mobile station, and there is no need to add new functions (sections 22 to 24 in FIG. 5(a)) shown in FIG. 5(a) to the control apparatus for the purpose of a cell change in the EUL scheme.

In FIG. 6(a), a cell change in the EUL scheme is performed at the same timing as a cell change in the HSDPA scheme. Accordingly, there is no need to add a new control signal shown in FIG. 5(a) for a cell change in the EUL scheme.

That is, the mobile station according to this embodiment applies a high-speed downlink packet transmission scheme (HSDPA scheme) in a downlink and an enhanced uplink transmission scheme (EUL scheme) in an uplink between the mobile station and a base station.

In the case where a condition for modifying a serving cell (service-providing cell) in the HSDPA scheme is satisfied (i.e., in the case where a cell change trigger in the HSDPA is generated), the cell change notification signal generating section 15 of the above-described mobile station transmits to the control apparatus a signal (cell change notification signal) for requesting to modify (cell change) a serving cell in the HSDPA scheme and a serving cell in the EUL scheme so that the serving cell in the HSDPA scheme and the serving cell in the EUL scheme become the same cell.

It should be noted that the serving-cell/sector and neighboring-cell/sector received CPICH comparing section 14 of the mobile station is configured to determine whether or not the condition for modifying a service-providing cell in the HSDPA scheme is satisfied, based on a received signal level in the mobile station.

Specifically, the serving-cell/sector and neighboring-cell/sector received CPICH comparing section 14 uses, as the received signal level in the mobile station, "Pathloss", "CPICH Ec/No", "CPICH RSCP", or the like measured by the neighboring cell/sector received CPICH measuring section 12 and the serving cell/sector received CPICH measuring section 13.

Here, "Pathloss" is a value obtained by subtracting the received power of a CPICH from the transmit power of the CPICH. It should be noted that the transmit power of the CPICH is transmitted on a broadcasting control channel.

Further, "CPICH Ec/No" is a value obtained by dividing the received power of the CPICH by the total received power, and "CPICH RSCP" is a value of the received power of the CPICH.

As described above, in this embodiment, a cell change in the EUL scheme is made simultaneously with a cell change in the HSDPA scheme. Accordingly, a control procedure load and a signal quantity can be prevented from increasing when a cell change in the EUL scheme is made.

(Second Embodiment of the Present Invention) Using FIGS. 7 to 10, a case will be described in which a physical control signal in the EUL scheme is time-multiplexed on an HS-DPCCH, by making a cell change by pairing a serving cell in the HSDPA scheme and a serving cell in the EUL scheme.

Figure 7:
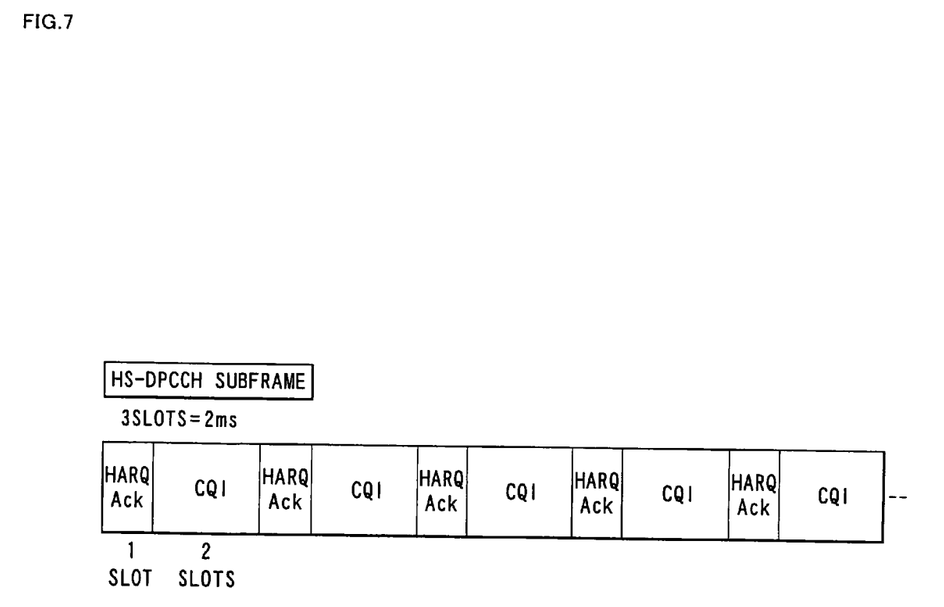
FIG. 7 is a view showing a slot format of an HS-DPCCH.

FIG. 7 shows the slot format of an ordinary HS-DPCCH. As shown in FIG. 7, on the HS-DPCCH, three-slot two-millisecond subframes are repeatedly transmitted. A subframe of the HS-DPCCH includes a one-slot HARQ-Ack and a two-slot CQI.

With the introduction of the EUL scheme, a method of multiplexing an uplink physical control signal according to the EUL scheme is currently being discussed in the 3GPP.

Figure 8:
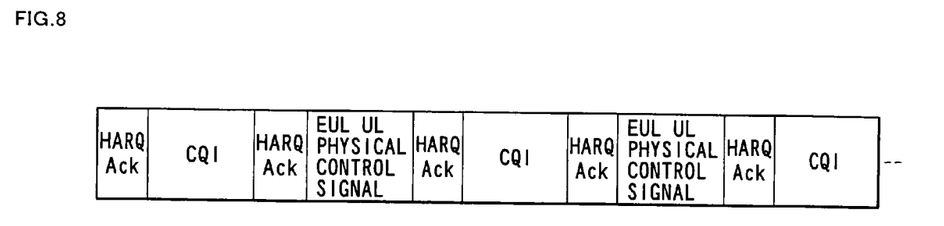
FIG. 8 is a view for explaining a method of multiplexing an uplink physical control signal according to the EUL scheme on an HS-DPCCH in a mobile communication system according to a second embodiment of the present invention.

As a multiplexing plan, as shown in FIG. 8, a plan is considered in which an uplink physical control signal (EUL UL physical control signal) according to the EUL scheme is time-multiplexed (e.g., by stopping the transmission of a slot for a CQI) on an HS-DPCCH and transmitted.

When this multiplexing method is employed, a base station needs to identify whether a signal on the HS-DPCCH is an uplink physical control signal according to the EUL scheme or a CQI.

In a 3GPP Release-6 base station in which both the HSDPA scheme and the EUL scheme are employed, some identifying function can be mounted, and therefore there is no problem.

However, in a 3GPP Release-5 base station which has already been developed and in which only the HSDPA scheme is employed, no consideration is given to transmitting an uplink physical control signal according to the EUL scheme on an HS-DPCCH, and therefore an identifying function is not mounted.

Accordingly, in the case where an uplink physical control signal according to the EUL scheme is multiplexed on an HS-DPCCH, a Release-5 base station cannot identify that, and determines that a CQI is being transmitted. Thus, quality in the HSDPA scheme is deteriorated.

Figure 9:
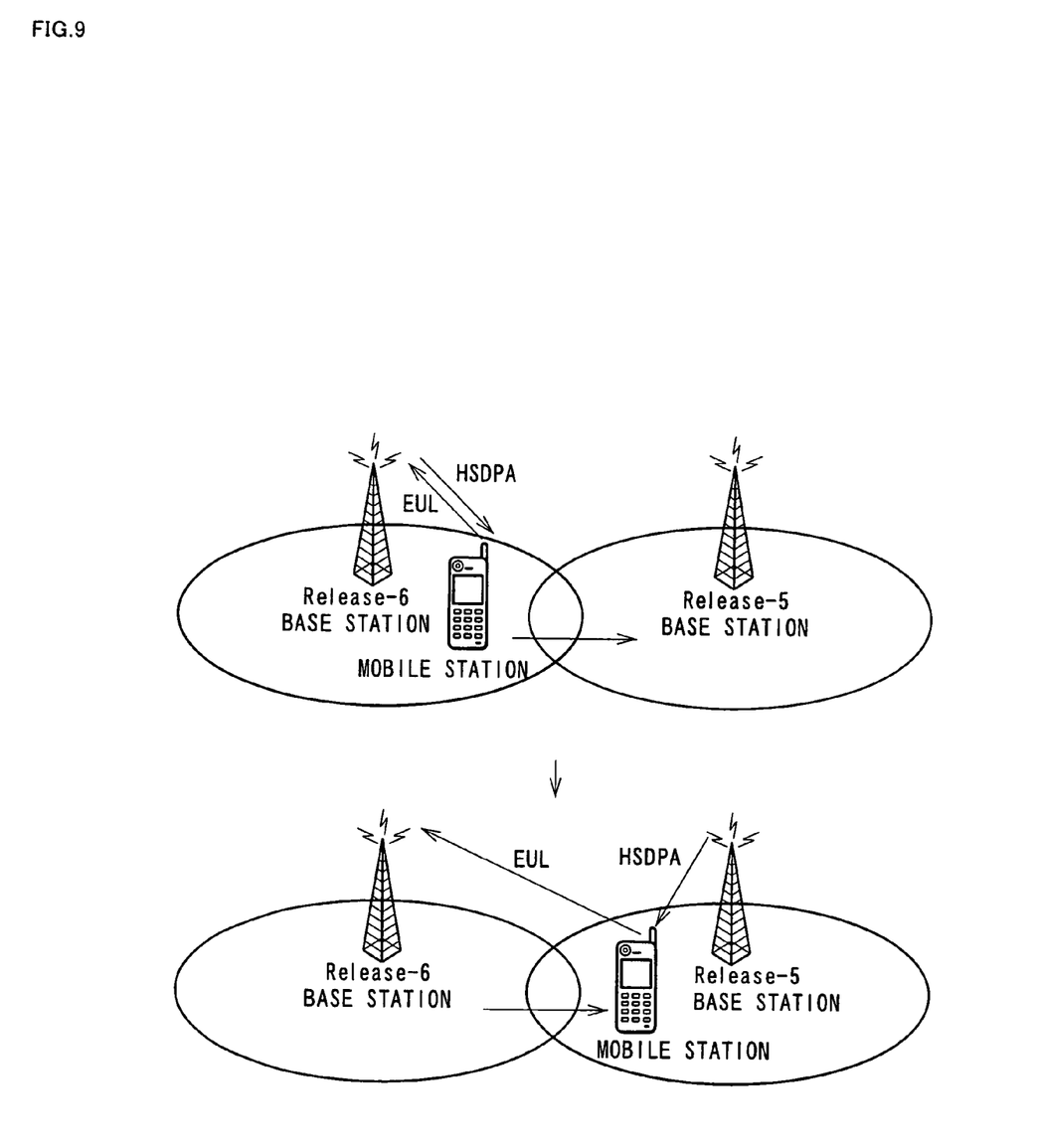
FIG. 9 is a view showing a case in which a cell change procedure in the HSDPA scheme and a cell change procedure in the EUL scheme are not paired.

This state can occur in the case where a cell change in the HSDPA scheme and a cell change in the EUL scheme are separately made as shown in FIG. 9.

In FIG. 9, the mobile station first communicates with a Release-6 base station using the HSDPA scheme and the EUL scheme. When the mobile station moves to the cell of a Release-5 base station next thereto, only a cell change trigger in the HSDPA scheme is generated, and therefore a cell change in the HSDPA scheme is made to the Release-5 base station.

However, at this time, the mobile station is still communicating with the Release-6 base station in the uplink using the EUL scheme. Accordingly, the mobile station transmits an uplink physical control signal according to the EUL scheme on an HS-DPCCH.

On the other hand, the Release-5 base station recognizes an uplink physical control signal according to the EUL scheme as a CQI even if the uplink physical control signal is transmitted on the HS-DPCCH. Thus, quality in the HSDPA scheme is deteriorated.

Accordingly, an uplink physical control signal according to the EUL scheme cannot be time-multiplexed on an HS-DPCCH, codes and radio resources for the uplink cannot be saved, and the PAR of the mobile station cannot be reduced.

The case shown in FIG. 9 can be avoided by pairing a cell change in the EUL scheme and a cell change in the HSDPA scheme. This case is shown in FIG. 10.

Figure 10:
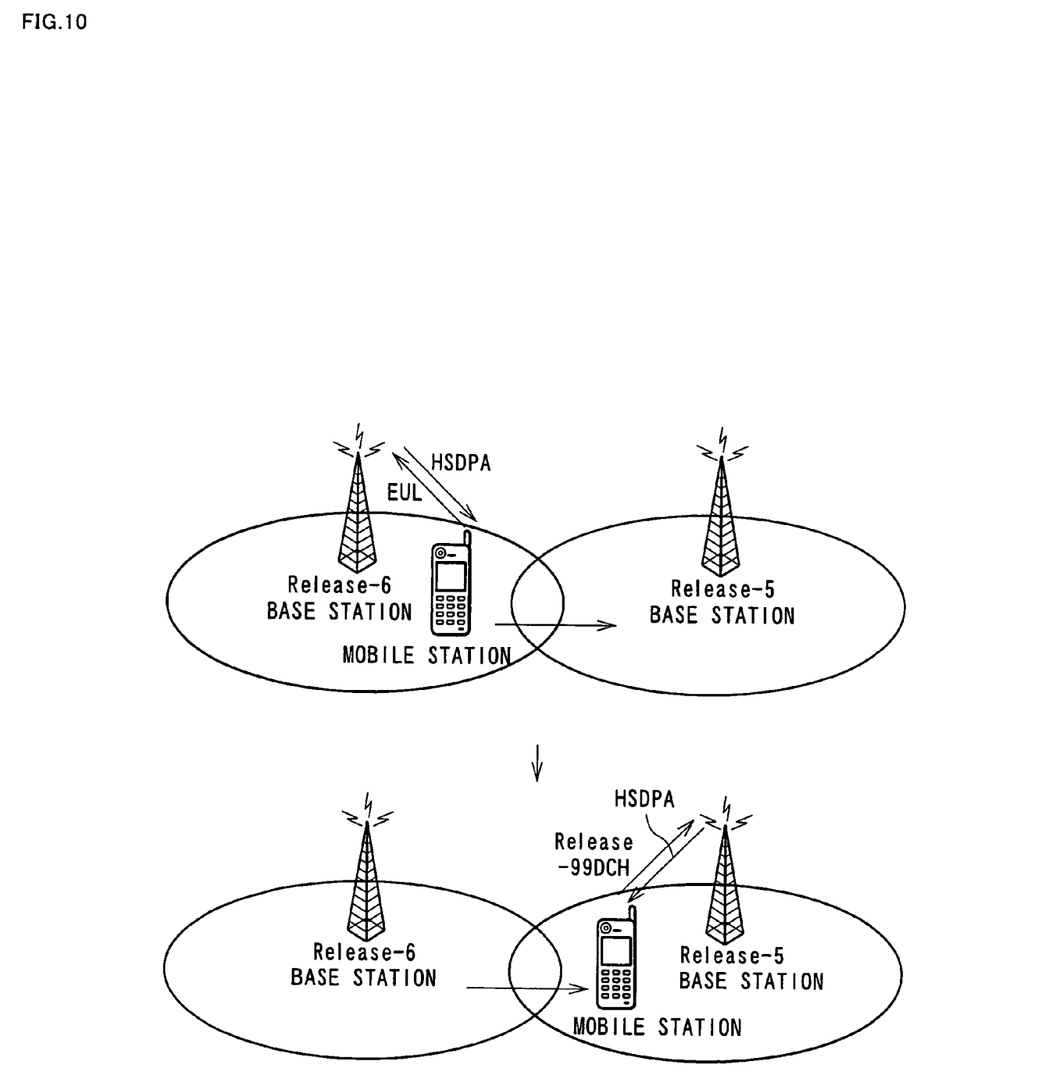
FIG. 10 is a view showing a case in which a cell change procedure in the HSDPA scheme and a cell change procedure in the EUL scheme are paired in the second embodiment of the present invention.

In FIG. 10, the mobile station first communicates with a Release-6 base station using the HSDPA scheme and the EUL scheme.

Then, when the mobile station moves toward a Release-5 base station, a cell change trigger in the HSDPA scheme is generated, and a cell change in the HSDPA scheme is made to the Release-5 base station.

At this time, in the case where a cell change in the EUL scheme is also made simultaneously with that in the HSDPA scheme, the uplink is also switched to the Release-5 base station.

However, in this case, the Release-5 base station does not deal with the EUL scheme. Accordingly, in the uplink, communications are performed using a Release-99 DCH.

Further, in the uplink, since transmission is performed using the Release-99 DCH, the mobile station stops multiplexing a physical control signal according to the EUL scheme on an HS-DPCCH, and transmits only a CQI on the HS-DPCCH.

Accordingly, when a cell change in the EUL scheme and a cell change in the HSDPA scheme are paired, even if a plan is employed in which an uplink physical control signal according to the EUL scheme is multiplexed on an HS-DPCCH in a Release-5 base station that does not employ the EUL scheme, this does not deteriorate characteristics in the HSDPA scheme.

Although the present invention has been described above in detail using embodiments, it is apparent to those skilled in the art that the present invention is not limited to the embodiments described in the present application. The apparatus of the present invention can be carried out as modified and changed aspects without departing from the spirit and scope of the present invention defined by the appended claims. Accordingly, the description of the present application is intended to be illustrative only, and not restrictive of the present invention.

<INDUSTRIAL APPLICABILITY>

As described above, according to the present invention, it is possible to provide a mobile communication system, a mobile station, and a control apparatus in which a cell change procedure in the EUL scheme and a cell change procedure in the HSDPA scheme are performed as a set, so as to prevent an increase in a control procedure load and a signal quantity at the time of a cell change, and to enable a physical control signal in the EUL scheme to be time-multiplexed on an HS-DPCCH.

The invention claimed is:

1. A mobile communication system comprising:
a base station which applies a high-speed downlink packet transmission scheme in downlink and an enhanced uplink packet transmission scheme in uplink between the base station and one or more mobile stations,
wherein a serving cell managed by the base station and providing the high-speed downlink packet transmission scheme for a specified mobile station and a serving cell managed by the base station and providing the enhanced uplink packet transmission scheme for the specified mobile station are configured to be changed, based on a cell change notification signal, to a new serving cell managed by a new base station capable of communicating with the specified mobile station using at least the high-speed downlink packet transmission scheme,
wherein the cell change notification signal is transmitted by the specified mobile station when a condition for changing the serving cell in the high-speed downlink packet transmission scheme is satisfied whether or not a condition for changing the serving cell in the enhanced uplink packet transmission scheme is satisfied, wherein the cell change notification signal includes a request to change the serving cell used in the high-speed downlink packet transmission scheme for the specified mobile station and a request to change the serving cell used in the enhanced uplink packet transmission scheme for the specified mobile station, wherein the new base station communicates with the specified mobile station using the enhanced uplink packet transmission scheme in a case where the new base station is also capable of communicating using the enhanced uplink packet transmission scheme, and wherein the new base station communicates with the specified mobile station using a non-enhanced uplink packet transmission scheme in a case where the new base station is not capable of communicating using the enhanced uplink packet transmission scheme.

2. The mobile communication system according to claim 1, wherein;

each mobile station is configured to determine whether or not the condition for changing the serving cell in the high-speed downlink packet transmission scheme is satisfied, based on a received signal level in the mobile station.

3. The mobile communication system according to claim 1, wherein the mobile station stops multiplexing a physical control signal to a base station on a high speed dedicated control channel and transmits only a channel quality indicator on the high speed dedicated control channel to the base station.

4. A mobile station comprising:
a controller; and
a transmitter;
wherein the controller is configured to apply a high-speed downlink packet transmission scheme in downlink and an enhanced uplink packet transmission scheme in uplink with a base station, and the transmitter is configured to transmit to a control apparatus a cell change notification signal for requesting to change a serving cell managed by the base station and providing the high-speed downlink packet transmission scheme and a serving cell managed by the base station and providing the enhanced uplink packet transmission scheme for the mobile station when a condition for changing the serving cell in the high-speed downlink packet transmission scheme is satisfied and whether or not a condition for changing the serving cell in the enhanced uplink packet transmission scheme is satisfied, wherein the cell change notification signal includes a request to change the serving cell used in the high-speed downlink packet transmission scheme for the mobile station and a request to change the serving cell used in the enhanced uplink packet transmission scheme for the mobile station, wherein the serving cell in the high-speed downlink packet transmission scheme for the mobile station and the serving cell in the enhanced uplink packet transmission scheme for the mobile station are configured to be changed, based on the cell change notification signal, to a new serving cell of a new base station capable of communicating with the mobile station using at least the high-speed downlink packet transmission scheme, wherein the new base station communicates with the mobile station using the enhanced uplink transmission scheme in a case where the new base station is also capable of communicating using the enhanced uplink packet transmission scheme, and wherein the base station communicates with the mobile station using a non-enhanced uplink packet transmission scheme in a case where the base station is not capable of communicating using the enhanced uplink packet transmission scheme.

5. The mobile station according to claim 4, wherein;
the mobile station is configured to determine whether or not the condition for changing the serving cell in the high-speed downlink packet transmission scheme is satisfied, based on a received signal level in the mobile station.

6. The mobile station according to claim 4, wherein the mobile station stops multiplexing a physical control signal to a base station on a high speed dedicated control channel and transmits only a channel quality indicator on the high speed dedicated control channel to the base station.

7. A control apparatus comprising:
a controller configured to apply a high-speed downlink packet transmission scheme in downlink and an enhanced uplink packet transmission scheme in uplink between a mobile station and a base station, wherein;
the controller is configured to:
receive a cell change notification signal from the mobile station requesting to change a serving cell managed by the base station and providing the high-speed downlink packet transmission scheme and a serving cell managed by the base station and providing the enhanced uplink packet transmission scheme for the mobile station when a condition for changing the serving cell in the high-speed downlink packet transmission scheme is satisfied and whether or not a condition for changing the serving cell in the enhanced uplink packet transmission scheme is satisfied, change, based on the cell change notification signal, the serving cell in the high-speed downlink packet transmission scheme for the mobile station and the serving cell in the enhanced uplink packet transmission scheme for the mobile station to a new serving cell managed by a new base station capable of communicating with the mobile station using at least the high-speed downlink packet transmission scheme, wherein the cell change notification signal includes a request to change the serving cell used in the high-speed downlink packet transmission scheme for the mobile station and a request to change the serving cell used in the enhanced uplink packet transmission scheme for the mobile station, wherein the new base station communicates with the mobile station using the enhanced uplink transmission schemes in a case where the new base station is also capable of communicating using the enhanced uplink packet transmission scheme, and wherein the new base station communicates with the mobile station using a non-enhanced uplink packet transmission scheme in a case where the base station is not capable of communicating using the enhanced uplink packet transmission scheme.

8. The control apparatus according to claim 7, wherein the specified mobile station stops multiplexing a physical control signal to a base station on a high speed dedicated control channel and transmits only a channel quality indicator on the high speed dedicated control channel to the base station.

* * * * *